US012761907B2

(12) United States Patent
Chichierchia et al.

(10) Patent No.: US 12,761,907 B2
(45) Date of Patent: Oct. 13, 2026

(54) METHOD FOR MODIFYING A TEST PROFILE IN AN INTEGRATED CIRCUIT CARD, CORRESPONDING INTEGRATED CIRCUIT CARD, TESTING METHOD AND APPARATUS

(71) Applicant: STMICROELECTRONICS S.r.l., Agrate Brianza (IT)

(72) Inventors: Maria Chichierchia, Castel Campagnano (IT); Mario Alghiri, San Nicola la Strada (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 517 days.

(21) Appl. No.: 18/464,811

(22) Filed: Sep. 11, 2023

(65) Prior Publication Data

US 2024/0095023 A1 Mar. 21, 2024

(30) Foreign Application Priority Data

Sep. 16, 2022 (IT) ........................ 102022000019056

(51) Int. Cl.
*G06F 8/70* (2018.01)

(52) U.S. Cl.
CPC .................................... *G06F 8/70* (2013.01)

(58) Field of Classification Search
CPC ............................... G06F 8/70; G06F 11/3684
See application file for complete search history.

(56) References Cited

U.S. PATENT DOCUMENTS

| | | | | |
|---|---|---|---|---|
| 7,347,380 | B2 * | 3/2008 | Ciesinger | G07F 7/1008 707/999.1 |
| 10,129,736 | B2 * | 11/2018 | Park | H04W 12/04 |
| 10,223,096 | B2 * | 3/2019 | Ziat | G06F 21/57 |
| 10,776,683 | B2 * | 9/2020 | Yi | H04W 8/183 |
| 2021/0120399 | A1 | 4/2021 | Auer et al. | |

FOREIGN PATENT DOCUMENTS

| | | |
|---|---|---|
| EP | 3783873 A1 | 2/2021 |
| JP | 2019145910 A | 8/2019 |

OTHER PUBLICATIONS

GSMA, "Generic eUICC Test Profile for Device Testing Version 4.0," GSM Association, Non-confidential Official Document TS.48, Jun. 15, 2021, pp. 1-16.

* cited by examiner

*Primary Examiner* — Elias Desta
(74) *Attorney, Agent, or Firm* — Seed IP Law Group LLP

(57) ABSTRACT

An integrated circuit includes a memory and processing circuitry. The memory stores an Elementary File Test (EFT) file including a record storing information to update a target elementary file (TGF) in a file system of the EFT. The stored information includes a file path identifier identifying a position of the TGF in the file system of the EFT file, which is a concatenation of a parent file identifier followed by an identifier of the TGF, a first length indicator of a first type of data, the data of the first type, a second length indicator to indicate a length of a second type of data, and the data of the second type. The processing circuitry, in operation, identifies the TGF based on the file path identifier and updates the content of the TGF to include the first data and one or more instances of the second data.

28 Claims, 7 Drawing Sheets

METHOD FOR MODIFYING A TEST PROFILE IN AN INTEGRATED CIRCUIT CARD, CORRESPONDING INTEGRATED CIRCUIT CARD, TESTING METHOD AND APPARATUS

CROSS-REFERENCE TO RELATED APPLICATION

This application is based upon and claims the benefit of priority from the prior Italian Patent Application No., IT 102022000019056, filed on Sep. 16, 2022, the entire contents of which are incorporated herein by reference.

BACKGROUND

Technical Field

The description relates to a method for modifying a test profile in an integrated circuit card, for an apparatus, in particular device, testing procedure on an apparatus comprising the integrated circuit card.

One or more embodiments may be applied, e.g., to Universal Integrated Circuit Cards (UICC), in particular embedded UICC (eUICC) for use, e.g., in mobile communication equipment. One more embodiments may also be applied for instance to i-UICC (integrated UICC).

Description of the Related Art

Mobile communication equipment in, e.g., GSM and UMTS networks may employ smart cards of the type currently referred to as Universal Integrated Circuit Card (UICC).

To this regard, FIG. 1 shows a possible architecture of an apparatus, or "user equipment" 10, such as a mobile device, e.g., a smartphone or a tablet, or a mobile communication module usually to be used in embedded systems. Generally, the device 10 comprises one or more processors 102 connected to one or more memories 104. The device 10 comprises moreover at least one mobile communication interface 106 for communication with a base station BS. For example, the mobile communication interface 106 may comprise a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) and/or LTE (Long Term Evolution) transceiver. A mobile device comprises often also a user interface 110, such as a touchscreen. Conversely, a communication module to be used, e.g., in embedded systems, such as alarm systems, gas meters or other types of remote monitoring and/or control systems, often does not comprise a user interface 110, but a communication interface 112 in order to exchange data with a further processing unit of an embedded system. For example, in this case, the interface 112 may be a digital communication interface, such as a UART (Universal Asynchronous Receiver-Transmitter), SPI (Serial Peripheral Interface) and/or USB (Universal Serial Bus) communication interface. Generally, the processing unit 102 may also be directly the main processor of an embedded system. In this case the interface 112 may be used to exchange data with one or more sensors and/or actuators. For example, in this case, the interface 112 may be implemented by means of one or more analog interfaces and/or digital input/output ports of the processing unit 102.

In the memory 104 may be stored, e.g., an operating system OS being executed by the processor 102 and which manages the general functions of the device 10, such as the management of the user interface 110 and/or the communication interface 112 and the establishment of a connection to the base station BS via the interface 106. The memory 104 may also contain applications being executed by the operating system OS. For example, in the case of a mobile device, the memory 104 often comprises a web browser application WB.

For establishing a connection with the base station BS, the device 10 is coupled to a processing unit 108 configured to manage the identification of the user. For example, usually a mobile device comprises a card holder for receiving a card comprising a Subscriber Identity Module (SIM), which is usually called SIM card. In general, a corresponding SIM module may also be installed directly within the device 10. In the example of FIG. 1 it is used a UICC 108, which is a smart card often used in, but not limited to, GSM and UMTS networks. The UICC ensures the integrity and security of all kinds of personal data and typically holds a few hundred kilobytes. Also, a UICC may be integrated directly in the device 10 and is in this case often called embedded UICC (eUICC). In particular a eUICC is a UICC which is not easily accessible or replaceable, is not intended to be removed or replaced in the terminal, and enables the secure changing of Subscriptions.

For example, in a GSM network, the UICC 108 contains a SIM application and in a UMTS network a USIM application. A UICC may contain several applications, making it possible for the same smart card to give access to both GSM and UMTS networks, and may also provide storage of a phone book and other applications.

Accordingly, the reference to a SIM module in the following of the present description is intended to include both 2G and/or 3G SIM modules and/or other SIM modules and applies also the case in which such a SIM module is provided on a SIM card.

As shown in FIG. 2, a SIM module 108 often comprises one or more processors 1082 and one or more memories 1084 for executing applications stored in the memory 1084 of the module 108. For example, the SIM module 108 may comprise in addition to the Subscriber Identity Module application (reference sign SIM in FIG. 2) at least one further application APP. For example, this application APP may be configured to communicate (directly, or indirectly via the processor 102 and possibly the operating system OS) with the mobile communication interface 106 in order to send data to and/or receive data from a remote host 30. For this purpose, the host 30 may be connected via a network 20, such as a Local Area Network (LAN) or a Wide Area Network (WAN), such as the internet, to the base station BS. Accordingly, connection between the host 30 and the UICC 108 may be established by means of the network 20, the base station BS and the communication interface 108. Generally, the communication may be initiated by the host 30 or the UICC 108. For example, the application APP may be a web server application, which receives requests from the web browser WB of a mobile device 10 and obtains respective content from a remote host 30, such as a web server. The application APP may also be an authentication application. In this case, the host 30 may send an authentication request to the UICC 108 and the UICC 108 may send an authentication response to the host 30.

As shown, a UICC may use a SIM application to access the GSM network and a USIM application to access a UMTS network. A UICC may contain several applications, making it possible for a same smart card to give access to several networks by also providing facilities to the users.

An operator may specify a set of applets, security domains and files that the smart card issuer stores in the smart card. This set of information is currently referred to as "profile".

A development of UICC cards is represented, as mentioned by embedded UICC (eUICC) which may be incorporated, e.g., in a mobile terminal, thus enabling a user to change operator (and so its profile) over the air by means of a software procedure. An eUICC is also capable of managing multiple mobile network operator subscriptions, by making it possible for a user to enable/disable a current profile on the fly in a secure manner.

UICC cards and eUICC cards may reside in a non-volatile memory (e.g., flash-based) used to store a profile.

As discussed previously, a profile may include:

- a hierarchy of security domains, that is specific applications which can be regarded as authentication entities (key containers) by means of which an operator can modify a profile over the air;
- a set of packages, that is a set of related classes and interfaces usually written by means of the Java Card language;
- a set of applets, that is applications capable of authenticating to a specific network (e.g., UMTS) or interact with the user; these applets may be written by means of a Java Card technology and may include many Java Card objects;
- a hierarchy of directories and files, which contain personalization information for the applets as well as data useful for authentication purposes or subscriber data.

Profile entities such as security domains, packages, applets, files may include a set of objects to be stored and handled by the operating system of the related apparatus.

Security domains and applets may include Java Card objects and code. These and other type of persistent entities (such as files and directories), are typically indivisible (in a UICC without memory management unit) and stored in memory.

Therefore, as explained above, in the field of eUICC (embedded Universal Integrated Circuit Card), removable or non-removable UICCs which enable the remote and/or local management of Profiles in a secure way, are used applets, e.g., small application, javacard based, running on a Java Virtual machine and are stored into profiles, e.g., a combination of data and applications to be provisioned on an eUICC for the purpose of providing services.

In this technical context, a test profile may be provided, e.g., a combination of data and applications to be provisioned on an eUICC to provide connectivity to test equipment for the purpose of testing the device comprising the eUICC card, e.g., a User equipment used in conjunction with an eUICC to connect to a mobile network, e.g., a tablet, wearable, smartphone or handset.

The GSMA specification TS 48 "UICC Test Profile for Device Testing" has defined a Generic Test Profile or GSMA Generic Test Profile as a result of an interest group of the test industry, device manufacturers and network operators finalized to Device Testing, e.g., testing of the apparatus hosting the integrated circuit card. The objective of such a Generic Test Profile is to be added in the eUICC for test purpose.

This Generic Test Profile has been specified to be fully compatible with the GSMA Embedded SIM specification for both M2M (Machine To Machine) and Consumer Devices.

In order to facilitate an efficient and cost-effective testability solution for all use cases it is recommended that the Generic Test Profile is pre-loaded on all eUICCs, during the manufacturing process. The presence of Generic Test Profile has to be persistent and not be deleted from the eUICC on a permanent basis.

For the execution of the functional tests according to the TS48 specification, before a device test starts, the Generic Test Profile shall be present on the device, e.g., smartphone, under test. It is underlined that the TS48 specification is directed to implement a test scenario but the final device tests like radio connectivity, authentication, network attach procedure, roaming, etc., are not contained in the TS48 specification, but in other specifications. Then, the tester or test equipment, e.g., a test computer configured to communicate with the device either wireless or more often through a cable connection, shall activate, or enable, the Generic Test Profile before executing the test case and, if necessary, configure the Generic Test Profile. It is possible to switch back to the Operational Profile after test case execution, however the Generic Test Profile remains active until specifically reset back to the original Profile. If a Test Applet is used for configuration of the Generic Test Profile, it is loaded before commencing testing.

As mentioned, in order to run test involving network coverage, remote card administration and other operations the Test equipment needs some "test" configuration. Such configuration can be obtained by manipulating the Test profile in order to adapt the Generic Test Profile in a specific Test profile suitable for a precise Test equipment. The way to adapt the Generic Test profile in a particular Test profile is reached by changing the content of some files. Such change can be performed remotely or via AT command or via an Applet, or Test Applet. All of the above methods represent different ways to operate change to the Generic Test profile.

In the GSMA specification TS 48 "UICC Test Profile for Device Testing" are provided just guidelines for the Test Applet and for the content of the EF (Elementary File) Test, indicating that a Test Applet could be defined and used in combination with any Profile modification methods to update the Generic Test Profile. Use of the Test Applet along with EF-TEST can simplify the method of updating the Generic Test Profile for executing any Test Suite. An Elementary File may be regarded as a file containing access conditions and data and no other files, as defined in GSM 11.11—Version 5.3.0—ETSI. The requirements of EF-TEST and Test Applet are indicated in the TS 48 specification, namely in Table C.1 and Table C.2 respectively, however the current state of the art does not allow to define the content of EF test file in order to be parsed by the Test Applet within the scope of profile change.

BRIEF SUMMARY

In an embodiment, a method comprises: storing, in a record of an Elementary File Test (EFT) file of an integrated circuit, information to update a target elementary file (TGF) in a file system of the EFT file, the stored information including: a file path identifier identifying a position of the TGF in the file system of the EFT file, wherein the file path identifier is a concatenation of a parent file identifier of a parent file of the TGF in the file system of the EFT file, followed by an identifier of the TGF in the file system of the EFT file; a first length indicator to indicate a length of a first type of data; first data of the first type having a length corresponding to the length indicated by the first length indicator; a second length indicator to indicate a length of a second type of data; and second data of the second type having a length corresponding to the length indicated by the second length indicator; and updating the TGF based on the stored information, the updating the TGF including: identifying the TGF based on the file path identifier; and updating content of the TGF to include: the first data; and one or more instances of the second data, wherein a number of the one or more instances of the second data is based on a size of the TGF.

In an embodiment, an integrated circuit comprises: a memory, which, in operation, stores an Elementary File Test (EFT) file and an application, the EFT file including a record storing information to update a target elementary file (TGF) in a file system of the EFT file, the stored information including: a file path identifier identifying a position of the TGF in the file system of the EFT file, wherein the file path identifier is a concatenation of a parent file identifier of a parent file of the TGF in the file system of the EFT file, followed by an identifier of the TGF in the file system of the EFT file; a first length indicator to indicate a length of a first type of data; first data of the first type having a length corresponding to the length indicated by the first length indicator; a second length indicator to indicate a length of a second type of data; and second data of the second type having a length corresponding to the length indicated by the second length indicator; and processing circuitry coupled to the memory, wherein processing circuitry, in operation, executes the application to update the TGF based on the stored information, the updating the TGF including: identifying the TGF based on the file path identifier; and updating content of the TGF to include: the first data; and one or more instances of the second data, wherein a number of the one or more instances of the second data is based on a size of the TGF.

In an embodiment, a system comprises: a mobile communication interface; and an integrated circuit coupled to mobile communication interface, the integrated circuit including: a memory, which, in operation, stores an Elementary File Test (EFT) file and an application, the EFT file including a record storing information to update a target elementary file (TGF) in a file system of the EFT file, the stored information including: a file path identifier identifying a position of the TGF in the file system of the EFT file, wherein the file path identifier is a concatenation of a parent file identifier of a parent file of the TGF in the file system of the EFT file, followed by an identifier of the TGF in the file system of the EFT file; a first length indicator to indicate a length of a first type of data; first data of the first type having a length corresponding to the length indicated by the first length indicator; a second length indicator to indicate a length of a second type of data; and second data of the second type having a length corresponding to the length indicated by the second length indicator; and processing circuitry coupled to the memory, wherein processing circuitry, in operation, executes the application to update the TGF based on the stored information, the updating the TGF including: identifying the TGF based on the file path identifier; and updating content of the TGF to include: the first data; and one or more instances of the second data, wherein a number of the one or more instances of the second data is based on a size of the TGF.

In an embodiment, a non-transitory computer-readable medium's contents configure processing circuitry to perform a method, the method comprising: storing, in a record of an Elementary File Test (EFT) file of an integrated circuit, information to update a target elementary file (TGF) in a file system of the EFT file, the stored information including: a file path identifier identifying a position of the TGF in the file system of the EFT file, wherein the file path identifier is a concatenation of a parent file identifier of a parent file of the TGF in the file system of the EFT file, followed by an identifier of the TGF in the file system of the EFT file; a first length indicator to indicate a length of a first type of data; first data of the first type having a length corresponding to the length indicated by the first length indicator; a second length indicator to indicate a length of a second type of data; and second data of the second type having a length corresponding to the length indicated by the second length indicator; and updating the TGF based on the stored information, the updating the TGF including: identifying the TGF based on the file path identifier; and updating content of the TGF to include: the first data; and one or more instances of the second data, wherein a number of the one or more instances of the second data is based on a size of the TGF.

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 3:
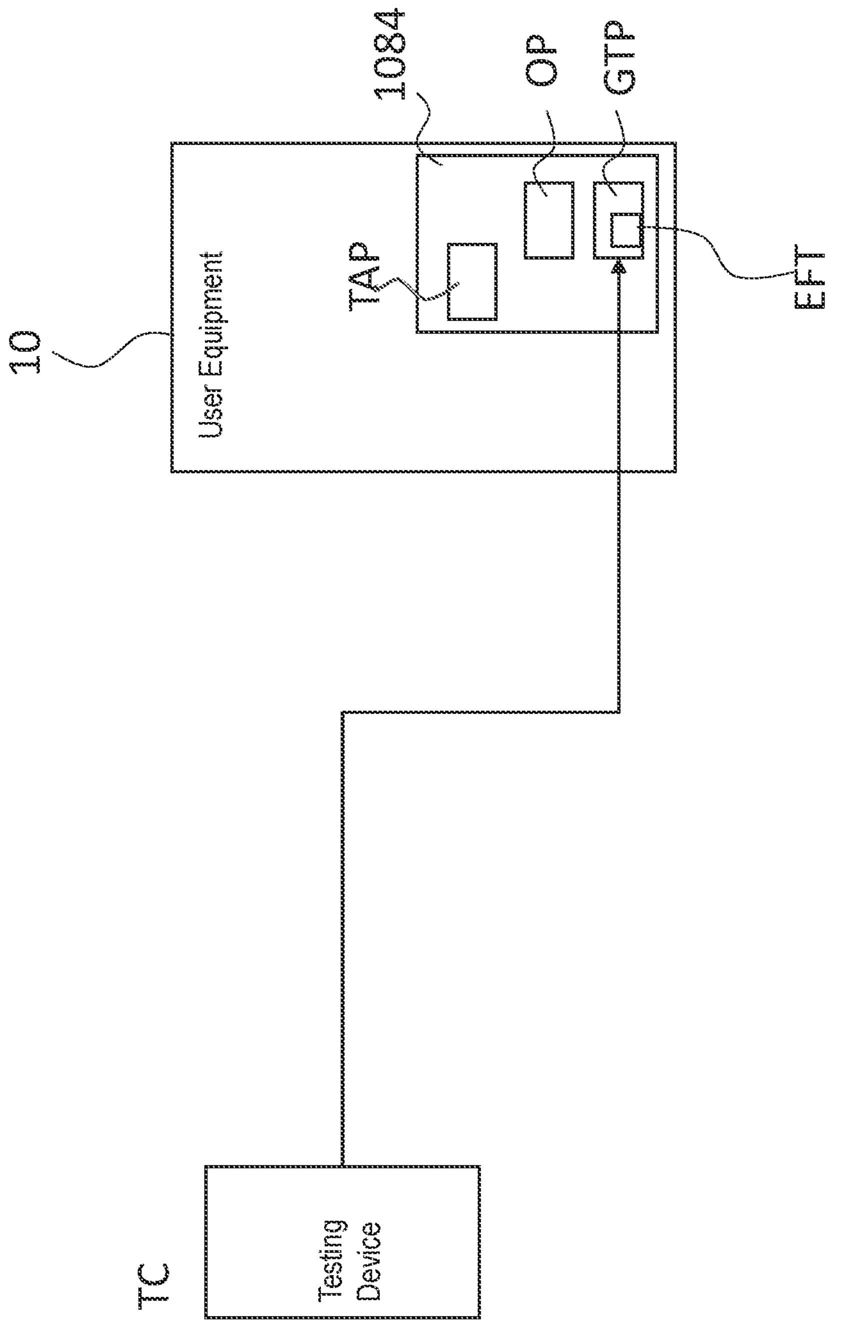
FIG. 3 is schematical representation of an architecture implementing the method according to embodiments.

In FIG. 3 it shown a block schematics of a system in which the method here described may be implemented.

Figure 1:
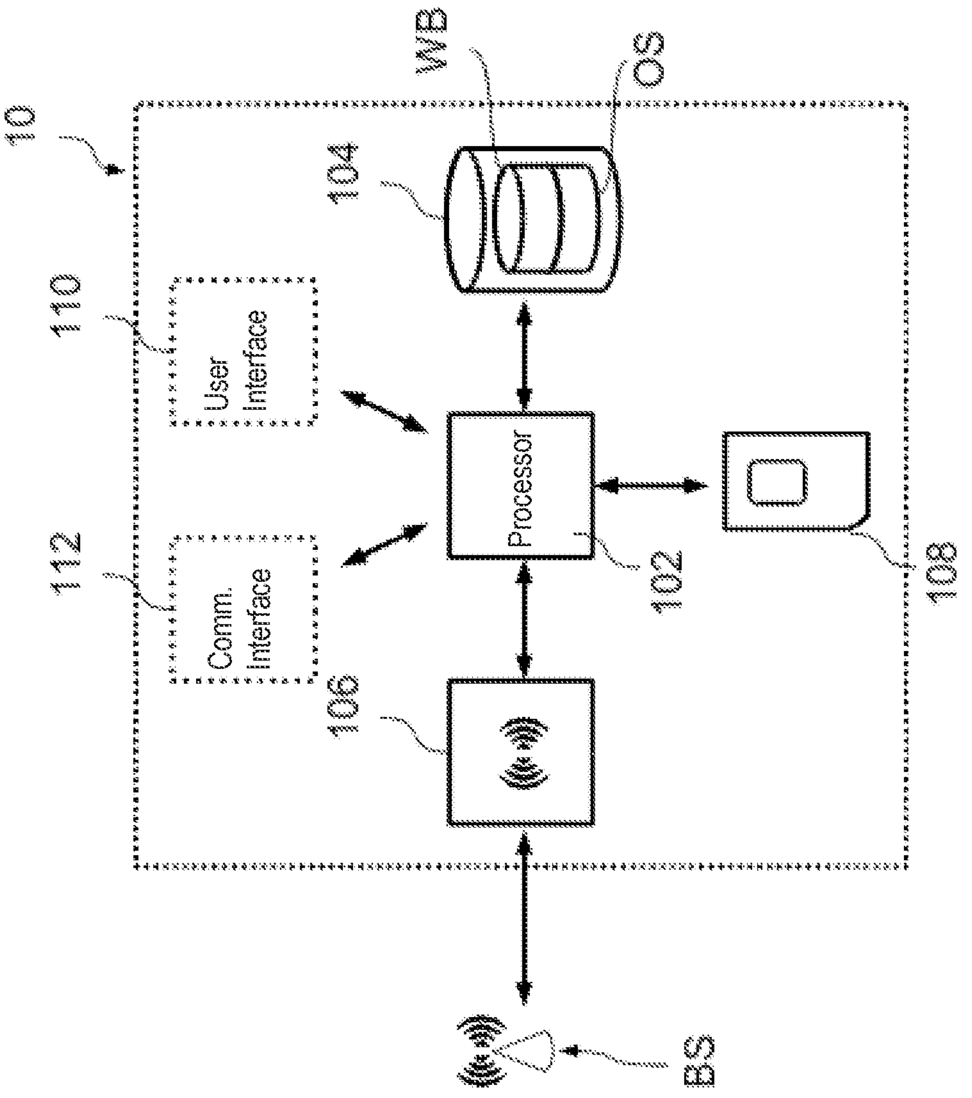
FIGS. 1, 2 have been already described in the foregoing.
Figure 2:
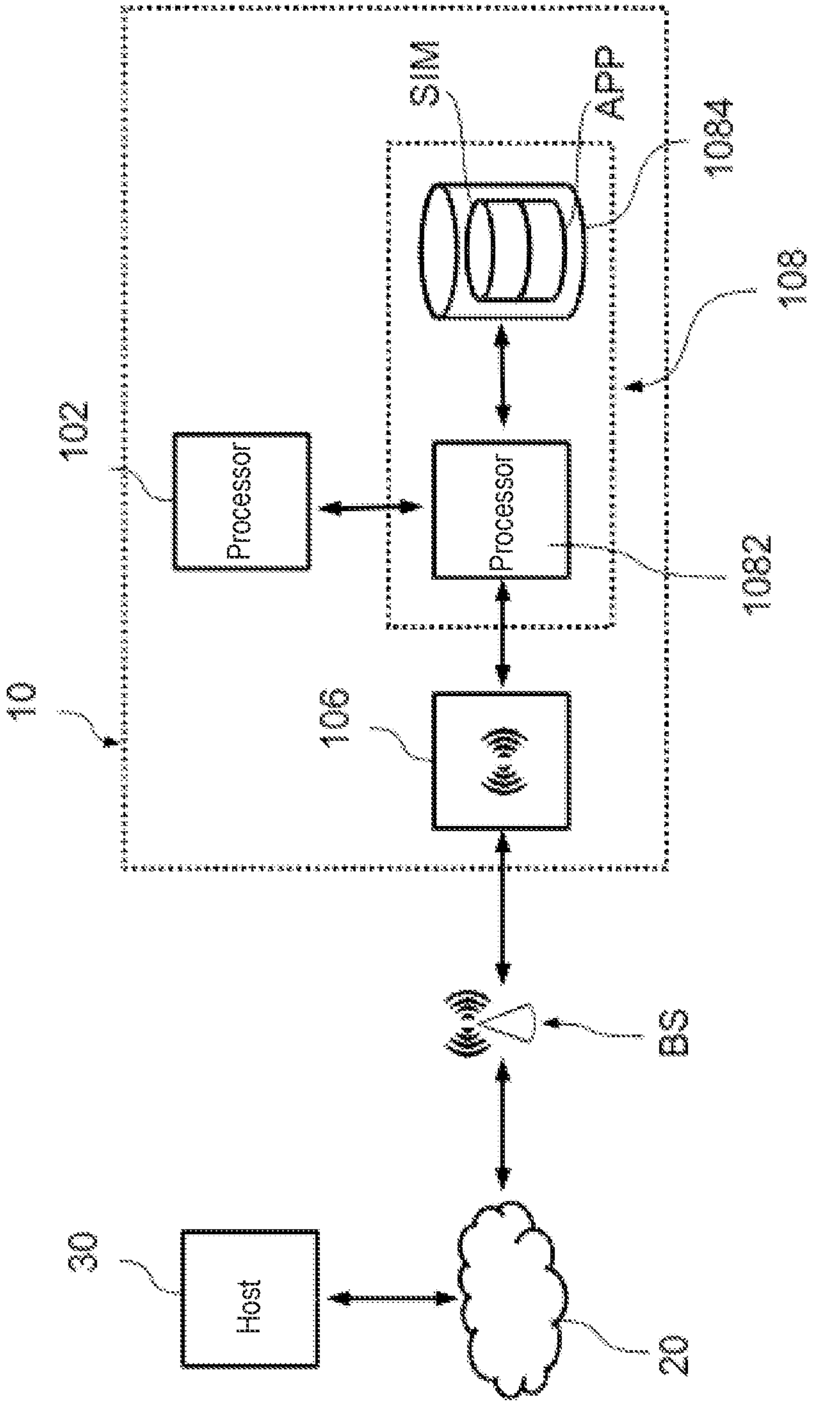

With TC is indicated a tester, e.g., a computer, in particular used by a tester user, which communicates with the apparatus, e.g., user equipment 10, in particular a device in the sense of the TS.48 specification, for instance a mobile communications apparatus such as a mobile phone, in which memory 1084 it is stored a Generic Test Profile GTP. The tester TC activates the Generic Test Profile GTP in order to perform the testing of the eUICC 108, indicated in FIGS. 1 and 2, comprising the memory 1084. In FIG. 3 it is also shown an operative profile OP, which, as said previously, is disabled when the Generic Test Profile GTP IT is enabled by the tester TC and re-enabled when the testing is finished.

The memory 1084 comprises a Test Applet TAP, which, as already indicated, is loaded before the testing. The Test Profile comprises an EF-TEST file EFT, which is accessed by the Test Applet TAP to perform the update.

As mentioned, in the GSMA specification TS 48 "UICC Test Profile for Device Testing" requirements of the EF-TEST file EFT and of the Test Applet TAP are indicated in the TS 48 specification itself, namely in Table C.1 and Table C.2 respectively. Then in the Table C.3 is indicated also the format of the Elementary file update data. These data are to be saved in EF-TEST file EFT records with numbers greater than one. The data format can be represented as <File Id>,<record #m>,<data to be updated>;<File Id>, <record #n>,<data to be updated>; . . .

<File Id> indicates the file identifier, the identifier of a file in the file system of the Generic Test Profile GTP which is to be accessed by the Test Applet TAP. <record #> indicates a record number in the file corresponding to the file identifier <File Id>, for Transparent files shall be 0 and it shall be greater than 0 for Linear files. <data to be updated> indicates the data in the file identified by the file identifier <File Id> on which the Test Applet TAP operates the update.

It is observed that in the data format just illustrated there is no indication as to how locate the file with the file identifier <File Id> by the Test Applet TAP and no indication on how build the data to be updated <data to be updated>. Also, there is no indication on operation results.

An embodiment of the solution here described therefore provides a method for modifying a test profile in an integrated circuit card, in particular an embedded UICC, to test an apparatus, in particular a device in the sense of GSMA specifications, hosting said integrated circuit card, said method comprising using as test profile a generic test profile stored in said integrated circuit card comprising an Elementary File Test file containing information for updating files in order to support apparatus test operations and a test applet configured to perform said updating on files of said generic test profile, said test applet being configured to perform an update operation on contents of a target elementary file with a determined file identifier, storing in a record of the Elementary File Test file information to perform said operation of update, said information to perform said operation of update in a record of the Elementary File Test file comprising a file path identifying the position of said target elementary file with a determined file identifier in the file system of the Elementary File Test file, obtained as the concatenation of a respective parent file identifier in the file system of the Elementary File Test file followed by the target Elementary File file identifier, data to be updated built as comprising a first type of data corresponding to significant data, preceded by a length indication of the first type of data, and a second type of data corresponding not significant data, represented as a filling pattern, in particular preceded by length indication of the second type of data, reading by the Test Applet said information to perform said operation of update in a record of the Elementary File Test file stored, performing said operation of update by selecting the target elementary file in the file system of the Elementary File Test file by said file path and updating its content with said significant data and said filling pattern used in one or more instances to fill the target elementary file until the end of its size, without providing the entire file content.

Here below is described by way of example a typical file structure in a Generic Test Profile in an eUICC card, such as card 108.

```
0 TARGET
1 MF 3F00 Master File
  2 EFL 2F00-DIR
  3 EFT 2FE2 -ICCID
  4 EFT 2F05 -PL
  5 DF 7F10 - Telecom
    6 DF 5F3A - Phonebook
      7 EFL 4F30 - PBR
      8 EFL 4F3A - ADN (Phonebook)
      9 EFL 4F12 - EXT1 (Phonebook)
  10 ADF 7FDO -U . . .
    11 DF 5F3B - GSM access
      12 EFT 4F20 -Kc
      13 EFT 4F52 KcGPRS
    14 EFT 6F05 LI
    15 EF ARR 6F06 -ARR(USIM)
    16 EFT 6F07 - IMSI <-Target file TGF
    17 EFT 6F08 - Keys
    18 DF 5FC0-5GS
      19 EFT 4F01 - 5GS3GPPLOCI
      20 EFT 4F02 - 5GS3GPPLOCI
```

The file system of the Generic Test Profile GTP has a tree structure with branches at different level.

In the example above, the format of each branch, besides an initial ordinal number N of the file structure position or branch, indicates a file type TF, the identifier of the file <File Id> and a description DS or mnemonical for the content or function of the file on that branch. Thus, each branch above is represented by a string "N MF<File Id>-DS".

The type of file TF can be for instance MF for Master file, DF for Directory File, ADF for Application Directory File, EF for Elementary File. Final letters added to EF designates transparent files (T), linear fixed files (L), cyclic files (C), while ARR indicates a file containing the access conditions for each file of the profile. The identifier of the file <File Id> is expressed as hexadecimal value.

As indicated above, under position N=1, the root (<File Id>=3F00) of the structure there are Elementary Files EF or Directory Files DF or Application Directory Files ADF.

0 TARGET identifies the File System of the Generic Test Profile GTP comprising the target Elementary File.

As shown, given the tree structure of the File System, with a parent-child structure of the branches, the Elementary Files have at least one parent file, a file in the branch level above. For instance, the file in the branch position 16, with the file identifier <File Id>6F07, is a child of branch position 10, ADF file with file identifier <File Id>7FDO.

Each record in the EF-TEST file should be properly selected in order to perform any operation such as read, update, etc.

The file path provides a way to locate a file into the File System 0 TARGET.

Any elementary file is candidate to be referred into the EF-TEST file according with the Test equipment TC, but in order to address the correct file it is necessary to provide also its location in the profile via a file path. In fact, under different Directory File DF or Application Directory Files ADF two elementary files EF can share the same file identifier <File Id>. Since in the GSMA TS48 specification, as said, there is no indication on how identify a target file, the elementary file on which perform the update, an embodiment of the solution here described provides using as file path the concatenation of the file identifier <File Id> of the parent file of the Elementary File EF to be located, e.g., a file DF/ADF, followed by the <File Id> of the Elementary File itself.

Thus, considering the elementary file EF in the branch position 16 as target file TGF, with the file identifier <File Id>6F07, which is a child of branch position 10, the ADF file with file identifier <File Id>7FDO, its file path is the file identifier <File Id> of the parent ADF File, followed by its own file identifier <File Id>, 7FDO6F07.

Thus, the method here described provides using as file path to select the target elementary file for the update operation the concatenation of a corresponding parent file followed by the file identification of the target elementary file.

In case of files under the Master file MF the File ID path shall be expressed as 3F002FXX, where 3F00 is the File_Id of the Master File. In general, any file under a directory file DF has as identifier the starting number of its parent minus one. Thus, as the Master file MF is 3F00 its children have an identifier starting with 2F (3F-1) while any elementary file under a directory file DF 7Fxx has as identifier 6Fxx (7F-1).

In case of ADF file, it uses the ADF File ID contained into GSMA implementation of TS48.

Then, according to an embodiment of the solution here described, it is provided building the data to be updated in the target elementary file as comprising two types of data, significant data, or Data SD, preceded by a length indication len, or Len of Data, and not significant data represented as a Filling Pattern FP, such filling pattern FP being used to fill the target elementary file until the end of size, without providing the entire file content. Using this operation, a dramatic space saving is obtained.

Significant data indicates data corresponding to a specific value enabling test scenarios. Not significant data are data corresponding generally to target file default values. The not significant data with respect to the significant data are homogeneous.

More in detail, the data to be updated <data to be updated> are indicated as significant data Data SD and a Filling Pattern FP (which represents Not significant data). Therefore, the format of the data to be updated <data to be updated> in the EF-TEST file is:

Len of Data||Data||Len of filling data||Filling pattern, where Len of Data is the length of the significant data Data SD as said, and Len of filling data is the length of the Filling Pattern.

The Test Applet TAP, according to the method here described, accesses the target file TGF, reads the significant data Data SD from the EF-TEST and replaces the corresponding data with the significant data Data SD and then by reading the Filling pattern and the corresponding length Len of filling data builds the overall new file content, fills the remaining space of the file not used by the significant data Data SD with a number of instances, or repetition, of the Filling Pattern FP sufficient to fill the remaining space in the target file TGF. It shall not be necessary to indicate also unused data in the replace operation.

The Test Applet TAP therefore is configured to build the target file TGF content by this way:

Data||Filling pattern||Filling pattern|| . . . ||Filling Pattern, Or SD||FP||FP|| . . . ||FP, the significant data Data SD followed by a number of instances of the Filling Pattern FP until the end of the size of the Target File, number of instances which the Test Applet TAP is able to calculate by using the value of Len of filling data in the data to be updated <data to be updated>.

Thus, the method, after providing the file path as shown above, indicates the data to be updated by identifying the significant data by preceding them with an indication of the length of the significant data, and not significant data indicated as filling pattern and an indication of the length of the filling pattern, building then a target file by replacing the significant data and filling the remaining new file content with said filling pattern.

In other words, the method here described provides building the data to be updated as comprising two types of data, significant data, preceded by a length indication, and not significant data represented as a filling pattern, the filling pattern being used to fill the target elementary file until the end of size, without providing the entire file content.

According to another further aspect of an embodiment of the solution here described, then, as already pointed out, the TS48 specification does not provide any mechanism to provide a result of profile switch operation, e.g., enablement of the Generic Test Profile GTP and subsequent testing, and a failure cause shall be result of the operation that the Test Applet TAP is performing like target file TGF selection, target file TGF accessing, target file TGF updating, an embodiment of the solution here described provides appending the successful/failure with cause result in the first record of the EF TEST file EFT, reusing the applet data structure acting as an applet input/output data structure.

By this way it is not necessary to use another data structure to host an operation result.

Figure 4:
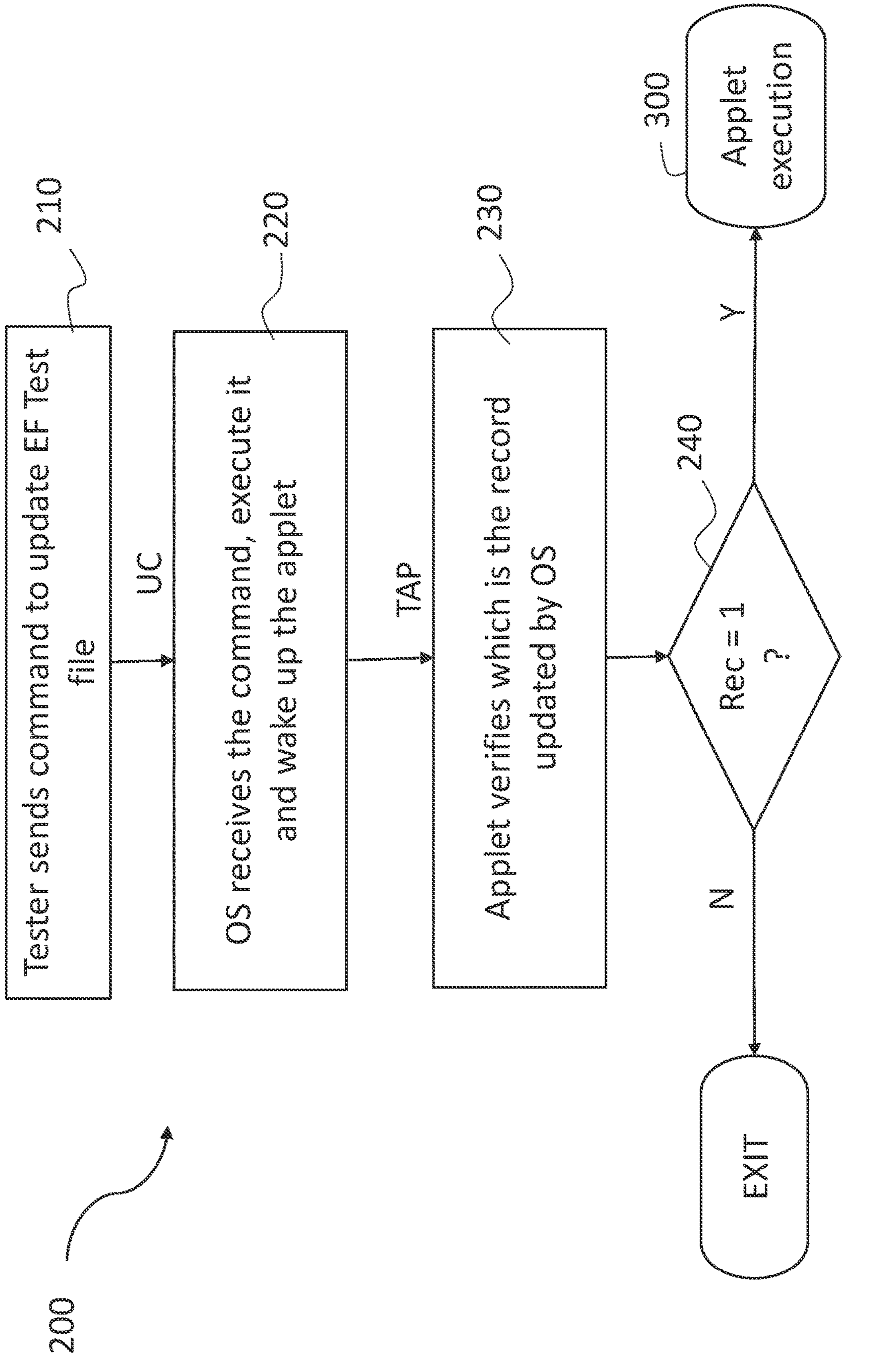
FIGS. 4 and 5 are flow diagrams exemplary of embodiments of the method here described.
Figure 5:
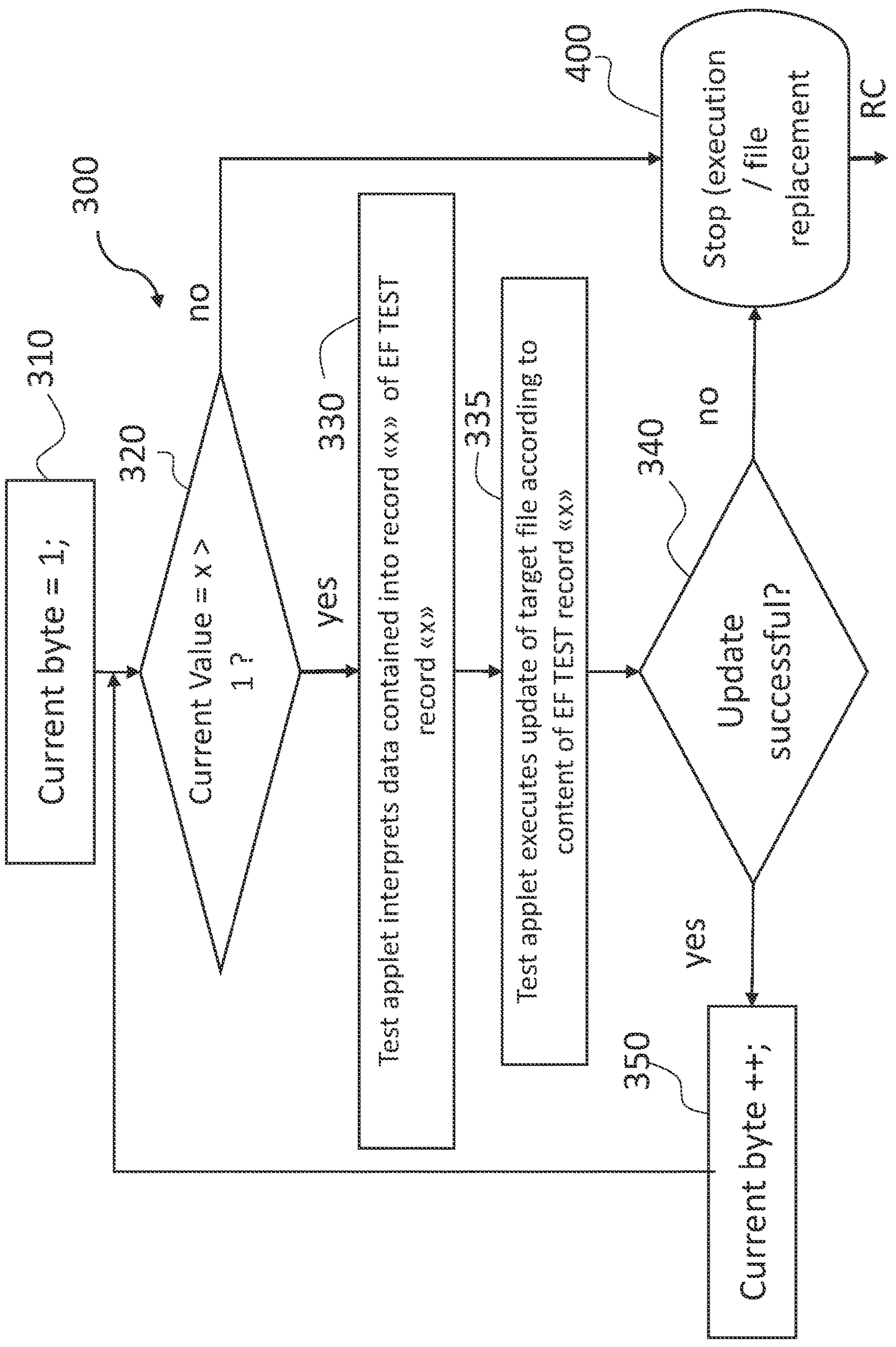

Hereafter in FIGS. 4 and 5 a flow diagram representing the procedure of the Test Applet is shown, comprising three operations:

Applet triggering (200)
Applet execution (300)
Operation result (400)

is reported in details.

In FIG. 4 it is shown a flow diagram representing the applet triggering operation 200.

At installation phase, the Test Applet TAP notifies the operating system of the eUICC 108 that requests to be woken up on an event of file update, indicated as Event File Update( ) which is a Toolkit event, e.g., an event which can trigger a Toolkit applet (see for instance the specification ETSI ts_102241 v150100p section 6.2), related to EF-TEST file ETF.

Therefore, the applet triggering operation 200 comprises a first step 210 in which a tester TC sends a command UC to update the EF Test file ETF.

Then, in a step 220 the operative system of the eUICC 108 receives such update command UC, executes it and wakes up the applet TAP.

In a step 230 the applet TAP verifies which is the record updated by operative system.

Then in a check block 240 is verified if the record number is one. In the affirmative, the operation 300 of applet execution is performed, else the operation 200 is stopped.

The applet execution operation 300 is depicted in a flow diagram in FIG. 4. In such step the applet reads the content of first record byte per byte. Test applet assumes as significant value any value different from a given value or given values, for instance, as described here in the following with reference to operation 400, different from 00 and 01 that are reserved for the refresh indication.

Figure 6:
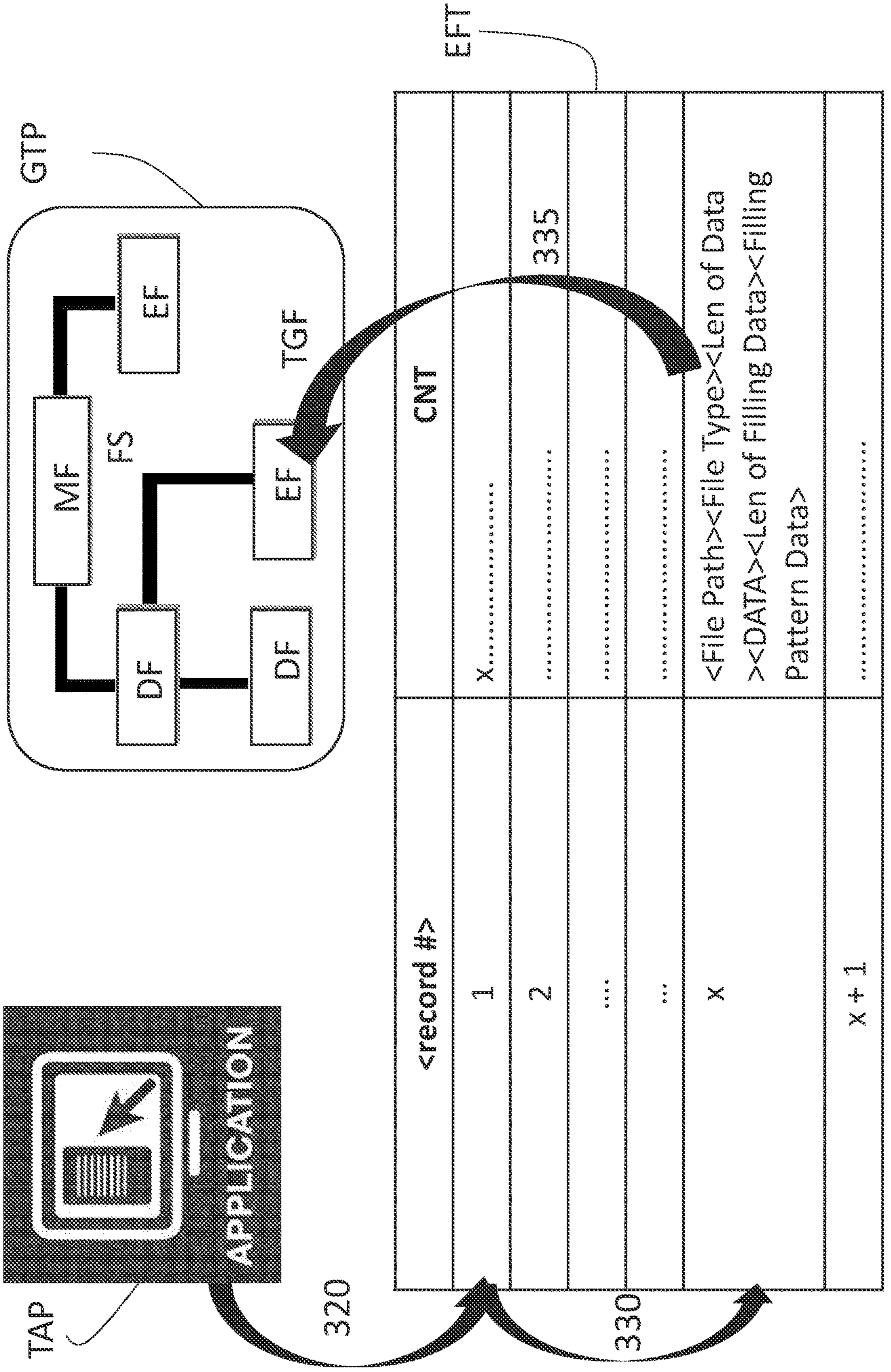
FIGS. 6 and 7 represent implementations of the method according to embodiments.
Figure 7:
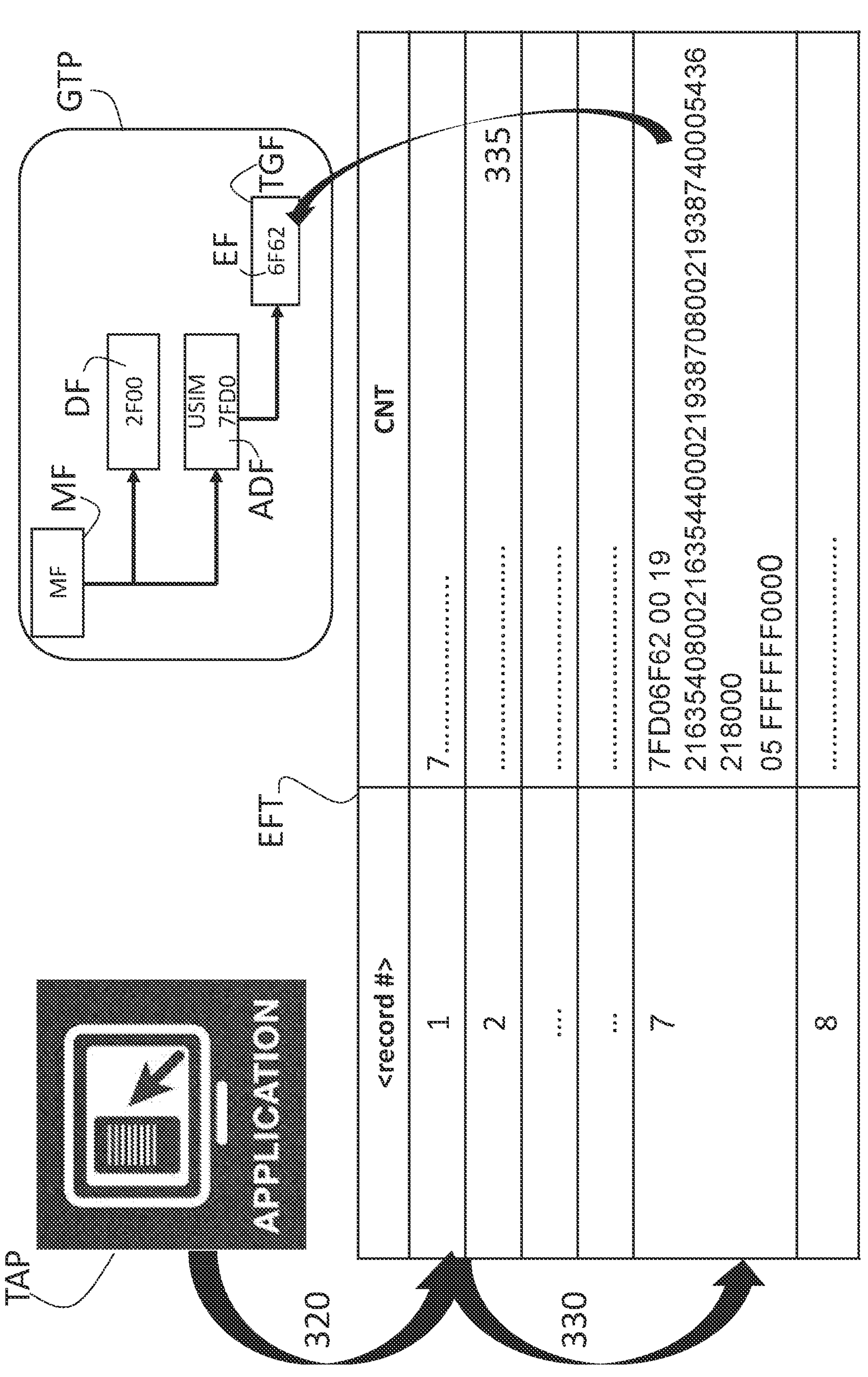

Thus, in the diagram of FIG. 5 in a first step 310 of the applet execution 300 the current byte is set to one, the current byte of the EF Test File EFT to be read by the Test Applet TAP. Then it is checked 320 if the current value, a record pointer «x», which value indicates a record containing a content CNT, as indicated in FIGS. 6 and 7, comprising the information for the update, is greater than one. In the negative, a stop execution/file replacement 400 is performed. In the affirmative, in a step 330 the Test Applet TAP interprets data contained into the record having the record number <record #> corresponding to the record pointer «x» of the EF TEST file EFT, the executes in a step 335 update of target file TGF according to content CNT of EF TEST record with record number <record #n>«x».

Then it is checked 340 if the update operation is successful. In the affirmative, in a step 350 the byte to be read is increased by one and control returns to the check step 320, the steps 330, 335 are applied to the next byte of the record, which is still the first record of the EF TEST file EFT. Else, the stop execution/file replacement 400 is performed. In particular, in this case an exception may be thrown so the applet is informed about the result.

Thus, the operation 300 substantially comprises reading 320 the content of a first record of the Elementary File Test file EFT byte by byte, in particular by steps 310, 350, if the value is greater than one, using 330 the value read for a given byte as a record pointer «x» to a further record X of the Elementary File Test file EFT, reading and interpreting a content CNT of said further record X said information for the update there stored, executing 335 said update of the target file TGF according to said content CNT of said further record (X) of the Elementary File Test file EFT.

The Test applet TAP is configured also to revert the file content of the target file TGF to its original values. In other words, the steps performed by the Test applet TAP to change the Generic Test profile in a profile suitable for a Test suite can be then applied to revert back to its original content. Thus, after step 335 and the execution of the test, a further operation of restore of the target file TGF using as content CNT the original content of the target file TGF may be performed by the Test applet TAP. This restore or revert operation also exploits data stored in the Elementary File Test file EFT. In this revert operation the Test applet TAP may perform the same update operation described with reference to the applet execution operation 300, in particular operation 335, accessing records (which number may be also indicated in the first record and read by the steps 320, 330 described above) in the Elementary File Test file EFT which contains the original values of the target files TGF just changed for the test. The content of the record pertaining such original values thus may be also expressed as <File Path><File Type><Len of Data ><Data><Len of Filling Data><Filling Pattern Data> and indicated in Table 1 below.

For instance, in case a test equipment requires changing 5 files, the Elementary File Test file EFT should be populated with at least 11 records, the first record which contains the information plus 5 records to store data for altering target files TGF and 5 records to revert the target files TGF to their original values. Thus the update operation here described, in particular with reference to applet execution operation 300, may be performed twice, one to update the data for the test, the other, after the test, to restore the original values in the files previously changed.

Regarding the stop execution/file replacement operation 400, as shown a first stop mechanism, stop operation, depend on the check 320. Checking 320 if the current value of the record pointer «x, is greater than one, means that the Test Applet TAP considers two values 00 and 01 as special byte value:

00 is interpreted as a refresh invocation 01 is interpreted as no refresh invocation Of course, if such values are present in the first byte an error occurs, the check 320 is negative.

Alternatively, the refresh invocation is performed if 00 otherwise the applet ends, stop 400.

The refresh operation is used to align the new content of file system with the file system image read by the phone/modem.

An example of refresh is shown below with reference to the example Table 3.

Then, for the stop file replacement 400 originate by the check 340, the update yields a failure, the Test Applet TAP updates the record number 1 of the EF Test File EFT by an error result code ERC followed by the number of the record of EF Test where the error occurred.

Thus, in general the method here described modifying a test profile in an integrated circuit card, in particular an embedded UICC, e.g., 108, to test an apparatus, or device, e.g., user equipment 10 hosting said integrated circuit card 108, said method comprising using as test profile a generic test profile, e.g., GTP stored in said integrated circuit card 108 comprising an Elementary File Test file EFT containing information for updating files in order to support apparatus test operations and a test applet TAP configured to perform said updating on files of said generic test profile GTP, such test applet TAP being configured to perform an update operation 335 on contents of a target elementary file TGF of said generic test profile GTP, wherein said operation of update 335 comprises, given a target elementary file TGF with a determined file identifier <File Id>, storing information to perform said operation of update in a record of the Elementary File Test file EFT <File Path>, <data to be updated>, said information to perform said operation of update in a record of the Elementary File Test file EFT <File Path>, <data to be updated> comprising a file path <File Path> identifying the position of said target elementary file TGF with a determined file identifier <File Id> in the file system FS of the Elementary File Test file EFT, obtained as the concatenation of a respective parent file identifier <File Id> in the file system FS of the Elementary File Test file EFT followed by the target Elementary File TGF file identifier <File Id>, data to be updated <data to be updated> built as comprising a first type of data SD corresponding to significant data, preceded by a length indication of the first type of data SD, and a second type of data corresponding not significant data, represented as a filling pattern FP, in particular preceded by length indication of the second type of data SD, reading 330 by the Test Applet TAP said information to perform said operation of update in a record of the Elementary File Test file EFT <File Path>, <data to be updated> stored, performing 335 said operation of update by selecting the target elementary file TGF in the file system FS of the Elementary File Test file EFT by said file path <File Path> and updating its content with said significant data DS and said filling pattern FP used in one or more instances to fill the target elementary file TGF until the end of its size, until the end of the space available in the target elementary file TGF after storing the significant data DS.

An example of the method here described may include a special Test equipment TC, finalized to test the correct home network attach.

Let the file system FS of the Generic Test Profile GTP in this example be as shown here below:

```
0 TARGET
1 MF 3F00 Master File
  2 EF AR 2F06 - EF ARR
  3 EFL 2F00-DIR
  4 EFT 2F05 -PL
  5 EFT 2FE2 -ICCID
    6 ADF 7FD0 - USIM
      7 EFT 6F05 - LI
      8 EFL ARR 6F06 - EF ARR USIM
      9 EFT 6F07 - IMSI
      10 EFT 6F08 - Keys
      11 EFT 6F09 - KeysPS
      12 EFT 6F31 - HPLMN
      13 EFT 6F38 - UST
      14 EFL 6F3B-FDN
      15 EFL 6F3C-SMS
      16 EFT 6F3E - GID1
      17 EFT 6F08 - Keys
      18 DF 6F62-HPLMwAcTech <–Target File TGF
      19 EFT 6F3F - GID2
      19 EFL 6F40 - MSISDN
```

In order to test the correct home network attach it is necessary for the Test Equipment TC to have the content of file 6F62 under the application data file ADF USIM with a specific content.

The file 6F62 holds as current content FFFFFF0000 . . . FFFFFF0000 (default value). A new file content here below

| | | | | | | | | | | | | | | | | | | | |
|---|---|---|---|---|---|---|---|---|---|---|---|---|---|---|---|---|---|---|---|
| **21** | **63** | **54** | **08** | **00** | **21** | **63** | **54** | **40** | **00** | **21** | **93** | **87** | **08** | **00** | **21** | **93** | **87** | **40** | **00** |
| **54** | **36** | **21** | **80** | **00** | FF | FF | FF | 00 | 00 | FF | FF | FF | 00 | 00 | FF | FF | FF | 00 | 00 |
| FF | FF | FF | 00 | 00 | FF | FF | FF | 00 | 00 | FF | FF | FF | 00 | 00 | FF | FF | FF | 00 | 00 |
| FF | FF | FF | 00 | 00 | FF | FF | FF | 00 | 00 | FF | FF | FF | 00 | 00 | FF | FF | FF | 00 | 00 |
| FF | FF | FF | 00 | 00 | FF | FF | FF | 00 | 00 | FF | FF | FF | 00 | 00 | FF | FF | FF | 00 | 00 |
| FF | FF | FF | 00 | 00 | FF | FF | FF | 00 | 00 | FF | FF | FF | 00 | 00 | FF | FF | FF | 00 | 00 |
| FF | FF | FF | 00 | 00 | FF | FF | FF | 00 | 00 | FF | FF | FF | 00 | 00 | FF | FF | FF | 00 | 00 |
| FF | FF | FF | 00 | 00 | FF | FF | FF | 00 | 00 | FF | FF | FF | 00 | 00 | FF | FF | FF | 00 | 00 |
| FF | FF | FF | 00 | 00 | FF | FF | FF | 00 | 00 | FF | FF | FF | 00 | 00 | FF | FF | FF | 00 | 00 |
| FF | FF | FF | 00 | 00 | FF | FF | FF | 00 | 00 | FF | FF | FF | 00 | 00 | FF | FF | FF | 00 | 00 |
| FF | FF | FF | 00 | 00 | FF | FF | FF | 00 | 00 | FF | FF | FF | 00 | 00 | FF | FF | FF | 00 | 00 |
| FF | FF | FF | 00 | 00 | FF | FF | FF | 00 | 00 | FF | FF | FF | 00 | 00 | FF | FF | FF | 00 | 00 |
| FF | FF | FF | 00 | 00 | FF | FF | FF | 00 | 00 | | | | | | | | | | |

and is the byte string in bold (first 25 bytes of 250 bytes, 21 63 54 08 00 21 63 54 40 00 21 93 87 08 00 21 93 87 40 00 54 36 21 80 00 which represents the significant data SD. The remaining (non significant) data are repeated occurrences of the filling pattern FP equal to FF FF FF 00 00.

For the execution of the applet triggering operation 200, the tester TC, e.g., a person with a test equipment, in charge to perform the test provides to update the record number 1 of EF TEST file EFT with a value «x».

Record number <record #n> equal to «x» contains information related to file to update.

This is shown in Table 1 herebelow, representing the EF TEST file ETF, which, in the first column has the record number <record #>«x» and in the second column its content CNT. Each row of Table 1 corresponds thus to a record of the EF TEST file ETF, with its record number <record #> and its content CNT.

TABLE 1

| <record #> | CNT |
|---|---|
| 1 | X..................... . . |
| 2 | ........................... . . |
| ... . | ........................... . . |
| ... | ........................... . . |
| X | <File Path><File Type><Len of Data ><Data><Len of Filling Data><Filling Pattern Data> |
| X + 1 | ........................... . . . |

As shown, record number <record #> with value «x» contains the content CNT equal to <File Path><File Type><Len of Data ><Data><Len of Filling Data><Filling Pattern Data>, all the information necessary to the Test Applet TAP to update the file with file identifier <File Id>6F62. The information includes the file path <File Path> and the data to be updated <data to be updated> equal to <Len of Data ><Data><Len of Filling Data><Filling Pattern Data> as indicated above. In this case, also a file type <File Type> is comprised after the file path <File Path>. The file path <File Path> is 7FD06F62, where 7FD0 is the file identifier <File Id> of the parent ADF USIM file of the Elementary File 6F62.

As shown, in embodiments, the information to perform said operation of update in a record of the Elementary File Test file (EFT) may comprise also a file type indication <File Type>, in particular said file type indication being set to zero if the target file is a transparent file otherwise being set to the record number of target file to be updated with Data.

For instance, as exemplified in Table 2, the tester may update the record n.1 of the EF TEST file EFT with a value 7.

Record 7 contains info related to the file to update (6F62).

TABLE 2

| <record #> | CNT |
|---|---|
| 1 | 7..................... . . |
| 2 | ........................... . . |
| ... . | ........................... . . |
| ... | ........................... . . |
| 7 | 7FD06F62 00 19 216354080021635440002193870800219387400054362180000 05 FFFFFF0000 |
| 8 | ........................... . . . |

It is quite apparent that instead of 250 bytes the record number 7 contains only 25 bytes of significant data DF plus 6 for the filling pattern FP.

The file path <File Path> is 7FD06F62, where 7FD0 is the file identifier of the parent file and 6F62 the file identifier of the child elementary file which is the target file TGF. Hexadecimal 19, decimal 25, represents the length len of the significant data SD in bytes, 05 the length in bytes of the filling pattern FP.

Then regarding the Applet Execution operation 300, with reference to Table 1 above, the Test Applet TAP reads record number 1 of the EF TEST file EFT, reads the value «x» therein and the test applet then jumps on record number #«x» as indicated in record #1.

Subsequently the Test Applet TAP interprets the data contained into the record, then the Test Applet TAP updates the file located by the file path <File Path> in the record number #«x».

With reference to Table 2 and the numerical example there, this means that the Test Applet TAP reads record With reference to Table 2 and the numerical example there, this means that the Test Applet TAP reads record number 1 of the EF TEST file, reads the value 7 therein and the Test Applet TAP then jumps on record number «7» as indicated in record n.1. Subsequently the test applet interprets the data contained into the record and the Applet updates file contained into file path <File Path> in the record number «7», file path 7FD06F62, where 7FD0 is the file identifier <File Id> of the parent ADF USIM file of the Elementary File 6F62.

In FIG. 6 it is shown schematically an architecture implementing the case of table 1, showing the Test Applet ATP TAP interacting with the EF TEST file EFT in the General Test Profile GTP to read the information, e.g., the operation 320, then performing operation 330 on record number #«x» of the EF TEST file EFT, e.g., the Test Applet TAP interprets data contained into the record having the record number <record #> corresponding to the record pointer «x» of the EF TEST file EFT, and operation 335, e.g., the Test Applet TAP executes update of target file TGF according to content CNT of EF TEST record with record number <record #>«x». on the corresponding target file TGF in the file system FS of the General Test Profile GTP.

In FIG. 7 it is shown schematically the architecture of FIG. 6 with the numerical values for <record #n>«x» and the content CNT (record #7 with content CNT 7FD06F62 00 19 21635408002163544000219387080021938740005436218000 05 FFFFFF0000) of Table 2.

As to the operation result in the step 400, if file update fails, the check step 340 fails, the test applet updates the first record of the EF TEST with an error indication which for instance comprises an error code followed by the number of the record of EF Test file ETF where the error occurred.

For instance an exemplary list of error codes may be:

0xF1 #recnum: Out of space (data to replace larger that target file/record size)

0xF2 #recnum: Access condition of target file NOT satisfied

0xF3 #recnum: Record Not present in the target file

0xF4 #recnum: File Not Found in the TS48 profile

0xF8 #recnum: Generic error (file type mismatch or wrong data in EF Test file EFT)

0xF5 #recnum Record not found in EF Test file EFT.

#recnum here stands for record number <record #>.

In variant embodiments, the error indication may comprise only the error code or further information regarding the error.

In case of update with success at the check 340, the test applet TAP updates the first record of the EF TEST file EFT by a result code 0xF0 00.

Then, here below is described a more detailed example, with reference to Table 3 below which exemplifies an EF-Test file EFT of an Elementary file EF Linear Fixed. The first column in table is the record number <record #n>, the second is the content, while a third columns contains a description explaining the operations in the content CNT column.

TABLE 3

| EF Test (3F00/2FFB) - EF Linear Fixed | | |
|---|---|---|
| <record #n> | CNT | Description |
| Record n. 1 | <record #n1><record #n2> . . . <Refresh flag> | record #n1 #n2 are the record numbers in EF Test file EFT and it will be >1. <Refresh flag> will be 0x00 for "Refresh Yes" and 0x01 for "Refresh NO" |
| Record n > 1 | <File Id><record #m><data to be updated> | <record #> for transparent files will be 0 and it will be >0 for Linear files. |

<data to be updated>=Len of Data ><Data>

Example:

<data to be updated>=01020304AABBAABBAABB< Len data>=04

<Data>=01020304

<Len Filling Pattern>=02

<Filling Pattern>=AABB

The Test Applet TAP updates the target file TGF with significant data SD, <Data>, 01020304 and then fill the remaining byte by the Filling Patterns AABB . . . AABB.

According to TS-48 profile, it is used the following FID in order to identify USIM, ISIM and CSIM ADF:

7FB0=ISIM

7FC0=CSIM

7FD0=USIM

The record numbers >1 of EF Test file EFT is filled according to GSMA TS.48 Generic Test Profile values and specific Test Profile values, this meaning data used by a tester to set his test environment for device testing.

A Specific profile is a Generic test Profile where one or more elementary files content has been replaced with data stored into EF Test file EFT by Test applet in order to set such profile suitable for a Test suite. As consequence a specific profile does not mean commercial profile.

Depending on the number of files to be changed, the records of the from number X to number Y of the EF Test file EFT contain "GSMA TS.48 Generic Test Profile" values and records from number M to number N will contain "Specific Test Profile" values with X, Y, M and N integers greater than 2, but X≠Y≠M≠N.

Example:

In case the EF-TEST file EFT contains

Rec X: [7FD06F07] [09 080910101032540636 00] . . . FFFFFF . . .

Rec M: [7FD06F07] [09 081932541632547698 00] . . . FFFFFF . . .

The Test Applet is registered on EVENT_EXTERNAL_FILE_UPDATE (operation 200).

Then Test Applet is triggered (operation 300) by Update command record n.1 of EF-TEST file EFT.

The triggering 300 of the GSMA TS.48 Generic Test Profile has in the record n.1 of EF-TEST file EFT:

Rec. 1=[X 00] . . . FFFFFF . . . (Refresh)

Rec. 1=[X 01] . . . FFFFFF . . . (No Refresh)

As result, the EF 6F07 under ADF USIM is updated (step 335) with the content of the GSMA TS.48 Generic Test Profile.

The triggering 300 of the Specific Test Profile has in the record n.1 of EF-TEST file EFT:

Rec. 1=[M 00] . . . FFFFFF . . . (Refresh)

Rec. 1=[M 01] . . . FFFFFF . . . (No Refresh)

As result the EF 6F07 under ADF USIM shall be updated (operation 335) with the content of Specific Test Profile.

From the description here above, example advantages of embodiments of the solution described are apparent.

An embodiment of the solution here described is interoperable, optimized, robust and provide a method of modifying a test profile for the cases not yet defined by the specifications, namely the TS-48 specification, in terms of Data Structure. As the TS-48 profile has no additional proprietary files, data are small in size, and the result of profile change is always recorded.

Without prejudice to the underlying principles, the details and embodiments may vary, even significantly, with respect to what has been described by way of example only, without departing from the extent of protection.

The extent of protection is defined by the annexed claims.

Method for modifying a test profile in an integrated circuit card, in particular an embedded UICC, (108), to test an apparatus (10), in particular a device, hosting said integrated circuit card (108), said method may be summarized as including using as test profile a generic test profile (GTP) stored in said integrated circuit card (108) including an Elementary File Test file (EFT) containing information for updating files in order to support apparatus test operations and a test applet (TAP) configured to perform said updating on files of said generic test profile (GTP), said test applet (TAP) being configured to perform an update operation (335) on contents of a target elementary file (TGF) with a determined file identifier (<File Id>), storing in a record of the Elementary File Test file (EFT) information to perform said operation of update ((<File Path>), <data to be updated>), said information to perform said operation of update in a record of the Elementary File Test file (EFT) ((<File Path>), <data to be updated>) including a file path (<File Path>) identifying the position of said target elementary file (TGF) with a determined file identifier (<File Id>) in the file system (FS) of the Elementary File Test file (EFT), obtained as the concatenation of a respective parent file identifier in the file system (FS) of the Elementary File Test file (EFT) followed by the target Elementary File (TGF) file identifier (<File Id>), data to be updated <data to be updated>) built as including a first type of data (SD) corresponding to significant data, preceded by a length indication of the first type of data (SD), and a second type of data corresponding not significant data, represented as a filling pattern (FP), in particular preceded by length indication of the second type of data (SD), reading (330) by the Test Applet (TAP) said information to perform said operation of update in a record of the Elementary File Test file (EFT) ((<File Path>), <data to be updated>) stored, performing (335) said operation of update by selecting the target elementary file (TGF) in the file system (FS) of the Elementary File Test file (EFT) by said file path (<File Path>) and updating its content with said significant data (DS) and said filling pattern (FP) used in one or more instances to fill the target elementary file (TGF) until the end of its size.

After performing (335) said operation of update may include checking (340) if said update operation is successful, in the negative, stopping (400) the file replacement operation, updating the first record of the Elementary File Test file (EFT) with an error indication.

Said error indication may include an error code followed by the number of the record of the Elementary File Test file (EFT) where the error has been generated.

Said method may include during installation phase of Test Applet (TAP), notifying the operating system to wake up said Test Applet (TAP) if a command (UC) to update the Elementary File Test file (EFT) is received at the apparatus (10), then performing an applet triggering operation (200) including a step (210) in which a tester (TC) sends said command (UC) to update the Elementary File Test file (EFT), then a step (220) in which an operative system of the embedded UICC (108) receives said update command (UC), executes it and wake up the Test Applet (TAP), a step (230) in which the Test Applet (TAP) verifies which is the record of the Elementary File Test file (EFT) updated by the operative system, a check step (240) in which is verified if the record number is one, in the affirmative the Test Applet is executed (300) else is stopped (400).

Said method may include an applet execution operation (300) including reading (320) the content of a first record of the Elementary File Test file (EFT) byte by byte (310, 350), if the value is greater than one, using (330) the value read for a given byte as a record pointer («x») to a further record (X) of the Elementary File Test file (EFT), reading and interpreting a content (CNT) of said further record (X) said information for the update there stored, executing (335) said update of the target file (TGF) according to said content (CNT) of said further record (X) of the Elementary File Test file (EFT).

Said Test applet (TAP) may be configured also to revert the file content of the target file (TGF) to its original values prior said update, in particular after the test execution.

Said Generic Test Profile (GTP), Elementary File Test file (EFT) and Test Applet (TAP) may correspond to the ones defined in the GSMA TS-48 specification.

Said integrated circuit card may be an embedded UICC or an integrated UICC.

Said information to perform said operation of update in a record of the Elementary File Test file (EFT) ((<File Path>), <data to be updated>) may include also a file type indication (<File Type>), in particular said file type indication (<File Type>) being set to zero if the target file is a transparent file otherwise being set to the record number of target file (TGF) to be updated.

A method of testing an apparatus, in particular a device (10), may be summarized as including an integrated circuit card (108) using a test profile (GTP) stored in said integrated circuit card, including the operations of said method for modifying a test profile.

An integrated circuit card, in particular an eUICC or iUICC, configured to perform a method, may be summarized as including: a memory (1084) configured to store said Generic Test Profile (GTP) and Test Applet (TAP), a one or more processors (102) configured to manage said operation of storing in a record of the Elementary File Test file (EFT) information to perform said operation of update ((<File Path>), <data to be updated>), and said reading (330) by the Test Applet said information to perform said operation of update from a record of the Elementary File Test file (EFT) ((<File Path>), <data to be updated>) ((<File Path>), <data to be updated>) and performing (335) said operation of update on said target file (TGF).

Apparatus (10) for use according to a profile stored in an integrated circuit card (108), the apparatus may be summarized as including an integrated circuit card (108).

Apparatus (10) may include an operating system configured for managing the integrated circuit card (108) with the method.

Apparatus may include a mobile communications apparatus (10).

In an embodiment, a method comprises: storing, in a record of an Elementary File Test (EFT) file of an integrated circuit, information to update a target elementary file (TGF) in a file system of the EFT file, the stored information including: a file path identifier identifying a position of the TGF in the file system of the EFT file, wherein the file path identifier is a concatenation of a parent file identifier of a parent file of the TGF in the file system of the EFT file, followed by an identifier of the TGF in the file system of the EFT file; a first length indicator to indicate a length of a first type of data; first data of the first type having a length corresponding to the length indicated by the first length indicator; a second length indicator to indicate a length of a second type of data; and second data of the second type having a length corresponding to the length indicated by the second length indicator; and updating the TGF based on the stored information, the updating the TGF including: identifying the TGF based on the file path identifier; and updating content of the TGF to include: the first data; and one or more instances of the second data, wherein a number of the one or more instances of the second data is based on a size of the TGF.

In an embodiment, the integrated circuit is embedded in a device and stores a generic test profile (GTP) including the EFT file and an application; and the updating of the TGF based on the stored information is performed under control of the application. In an embodiment, the method comprises: executing a test of the device based on the updated TGF. In an embodiment, the device is a first device and the method comprises: executing of the test of the first device under control of a second device.

In an embodiment, the method comprises: determining whether the updating of the TGF was successful; and in response to a determination that the updating was not successful, modifying the EFT file to include an indication of an error. In an embodiment, the error indication comprises an error code followed by a number of the record of the EFT file.

In an embodiment, the method comprises: transmitting, by the second device, a command to update the EFT file; and responding, by an operating system of the integrated circuit, to the command to update the EFT by invoking the application. In an embodiment, the method comprises: determining, by the application, a record number associated with the command to update the EFT file; and selecting performing the update of the EFT file based on the determined record number associated with the command to update the EFT file. In an embodiment, the method comprises: in response to the determined record number associated with the command to update the EFT file being equal to 1, performing the update of the EFT file; and in response to the determined record number not being equal to 1, not performing the update of the EFT file.

In an embodiment, the method comprises: receiving an update command associated with a plurality of TGFs of the EFT file; responding, by the application, to the received update command by: reading content of a first record of the EFT file byte-by-byte; and in response to a read value of a byte of the first record of the EFT file being greater than 1, performing an update operation on a TGF of the plurality of TGFs based on information stored in another record of the EFT file corresponding to the read value of the byte.

In an embodiment, the method comprises: restoring, under control of the application and after execution of the test, the content of the TGF to a content of the TGF prior to the updating of the TGF.

In an embodiment, the GTP, the EFT file, and the application correspond to a GTP, an EFT file and a Test Applet (TA) file as defined in the GSMA TS-48 specification.

In an embodiment, the integrated circuit is an embedded Universal Integrated Circuit Cards (UICC) or an integrated UICC.

In an embodiment, the stored information to update a TGF includes a file type indication which is set to zero if the TGF is a transparent file and otherwise is set to a record number of the TGF.

In an embodiment, an integrated circuit comprises: a memory, which, in operation, stores an Elementary File Test (EFT) file and an application, the EFT file including a record storing information to update a target elementary file (TGF) in a file system of the EFT file, the stored information including: a file path identifier identifying a position of the TGF in the file system of the EFT file, wherein the file path identifier is a concatenation of a parent file identifier of a parent file of the TGF in the file system of the EFT file, followed by an identifier of the TGF in the file system of the EFT file; a first length indicator to indicate a length of a first type of data; first data of the first type having a length corresponding to the length indicated by the first length indicator; a second length indicator to indicate a length of a second type of data; and second data of the second type having a length corresponding to the length indicated by the second length indicator; and processing circuitry coupled to the memory, wherein processing circuitry, in operation, executes the application to update the TGF based on the stored information, the updating the TGF including: identifying the TGF based on the file path identifier; and updating content of the TGF to include: the first data; and one or more instances of the second data, wherein a number of the one or more instances of the second data is based on a size of the TGF. In an embodiment, the integrated circuit stores a generic test profile (GTP) including the EFT file and the application. In an embodiment, the processing circuitry, in operation: determines whether the updating of the TGF was successful; and in response to a determination that the updating was not successful, modifies the EFT file to include an indication of an error.

In an embodiment, the processing circuitry, in operation: determines, under control of the application, a record number associated with a command to update the EFT file; and selecting performs, under control of the application, the update of the EFT file based on the determined record number associated with the command to update the EFT file.

In an embodiment, the processing circuitry, in operation: receives an update command associated with a plurality of TGFs of the EFT file; responds, under control of the application, to the received update command by: reading content of a first record of the EFT file byte-by-byte; and in response to a read value of a byte of the first record of the EFT file being greater than 1, performing an update operation on a TGF of the plurality of TGFs based on information stored in another record of the EFT file corresponding to the read value of the byte.

In an embodiment, the GTP, the EFT file, and the application correspond to a GTP, an EFT file and a Test Applet (TA) file as defined in the GSMA TS-48 specification. In an embodiment, the integrated circuit is an embedded Universal Integrated Circuit Cards (UICC) or an integrated UICC.

In an embodiment, a system comprises: a mobile communication interface; and an integrated circuit coupled to mobile communication interface, the integrated circuit including: a memory, which, in operation, stores an Elementary File Test (EFT) file and an application, the EFT file including a record storing information to update a target elementary file (TGF) in a file system of the EFT file, the stored information including: a file path identifier identifying a position of the TGF in the file system of the EFT file, wherein the file path identifier is a concatenation of a parent file identifier of a parent file of the TGF in the file system of the EFT file, followed by an identifier of the TGF in the file system of the EFT file; a first length indicator to indicate a length of a first type of data; first data of the first type having a length corresponding to the length indicated by the first length indicator; a second length indicator to indicate a length of a second type of data; and second data of the second type having a length corresponding to the length indicated by the second length indicator; and processing circuitry coupled to the memory, wherein processing circuitry, in operation, executes the application to update the TGF based on the stored information, the updating the TGF including: identifying the TGF based on the file path identifier; and updating content of the TGF to include: the first data; and one or more instances of the second data, wherein a number of the one or more instances of the second data is based on a size of the TGF.

In an embodiment, the processing circuitry, in operation: receives an update command associated with a plurality of TGFs of the EFT file; responds, under control of the application, to the received update command by: reading content of a first record of the EFT file byte-by-byte; and in response to a read value of a byte of the first record of the EFT file being greater than 1, performing an update operation on a TGF of the plurality of TGFs based on information stored in another record of the EFT file corresponding to the read value of the byte.

In an embodiment, the system comprises a first device including the mobile communication interface and the integrated circuit, wherein the integrated circuit is an embedded Universal Integrated Circuit Cards (UICC) or an integrated UICC. In an embodiment, the system comprises a second device coupled to the first device, wherein the second device, in operation, initiates execution of a test of the first device, the test using the updated TGF.

In an embodiment, a non-transitory computer-readable medium's contents configure processing circuitry to perform a method, the method comprising: storing, in a record of an Elementary File Test (EFT) file of an integrated circuit, information to update a target elementary file (TGF) in a file system of the EFT file, the stored information including: a file path identifier identifying a position of the TGF in the file system of the EFT file, wherein the file path identifier is a concatenation of a parent file identifier of a parent file of the TGF in the file system of the EFT file, followed by an identifier of the TGF in the file system of the EFT file; a first length indicator to indicate a length of a first type of data; first data of the first type having a length corresponding to the length indicated by the first length indicator; a second length indicator to indicate a length of a second type of data; and second data of the second type having a length corresponding to the length indicated by the second length indicator; and updating the TGF based on the stored information, the updating the TGF including: identifying the TGF based on the file path identifier; and updating content of the TGF to include: the first data; and one or more instances of the second data, wherein a number of the one or more instances of the second data is based on a size of the TGF. In an embodiment, the contents comprise instructions executed by the processing circuitry. In an embodiment, the method comprises: receiving an update command associated with a plurality of TGFs of the EFT file; responding to the received update command by: reading content of a first record of the EFT file byte-by-byte; and in response to a read value of a byte of the first record of the EFT file being greater than 1, performing an update operation on a TGF of the plurality of TGFs based on information stored in another record of the EFT file corresponding to the read value of the byte.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

storing, in a record of an Elementary File Test (EFT) file of an integrated circuit, information to update a target elementary file (TGF) in a file system of the EFT file, the stored information including:

a file path identifier identifying a position of the TGF in the file system of the EFT file, wherein the file path identifier is a concatenation of a parent file identifier of a parent file of the TGF in the file system of the EFT file, followed by an identifier of the TGF in the file system of the EFT file;

a first length indicator to indicate a length of a first type of data;

first data of the first type having a length corresponding to the length indicated by the first length indicator;

a second length indicator to indicate a length of a second type of data; and second data of the second type having a length corresponding to the length indicated by the second length indicator; and updating the TGF based on the stored information, the updating the TGF including:

identifying the TGF based on the file path identifier; and updating content of the TGF to include:

the first data; and one or more instances of the second data, wherein a number of the one or more instances of the second data is based on a size of the TGF.

2. The method of claim 1, wherein, the integrated circuit is embedded in a device and stores a generic test profile (GTP) including the EFT file and an application; and the updating of the TGF based on the stored information is performed under control of the application.

3. The method of claim 2, comprising:

executing a test of the device based on the updated TGF.

4. The method of claim 3, wherein the device is a first device and the method comprises:

executing of the test of the first device under control of a second device.

5. The method of claim 1, comprising:

determining whether the updating of the TGF was successful; and in response to a determination that the updating was not successful, modifying the EFT file to include an indication of an error.

6. The method of claim 5, wherein the error indication comprises an error code followed by a number of the record of the EFT file.

7. The method of claim 4, comprising:

transmitting, by the second device, a command to update the EFT file; and responding, by an operating system of the integrated circuit, to the command to update the EFT by invoking the application.

8. The method of claim 7, comprising:

determining, by the application, a record number associated with the command to update the EFT file; and selecting performing the update of the EFT file based on the determined record number associated with the command to update the EFT file.

9. The method of claim 8, comprising:

in response to the determined record number associated with the command to update the EFT file being equal to 1, performing the update of the EFT file; and in response to the determined record number not being equal to 1, not performing the update of the EFT file.

10. The method of claim 2, comprising:

receiving an update command associated with a plurality of TGFs of the EFT file;

responding, by the application, to the received update command by:

reading content of a first record of the EFT file byte-by-byte; and in response to a read value of a byte of the first record of the EFT file being greater than 1, performing an update operation on a TGF of the plurality of TGFs based on information stored in another record of the EFT file corresponding to the read value of the byte.

11. The method of claim 3, comprising:

restoring, under control of the application and after execution of the test, the content of the TGF to a content of the TGF prior to the updating of the TGF.

12. The method of claim 2, wherein the GTP, the EFT file, and the application correspond to a GTP, an EFT file and a Test Applet (TA) file as defined in the GSMA TS-48 specification.

13. The method of claim 2, wherein the integrated circuit is an embedded Universal Integrated Circuit Cards (UICC) or an integrated UICC.

14. The method of claim 1, wherein the stored information to update a TGF includes a file type indication which is set to zero if the TGF is a transparent file and otherwise is set to a record number of the TGF.

15. An integrated circuit, comprising:

a memory, which, in operation, stores an Elementary File Test (EFT) file and an application, the EFT file including a record storing information to update a target elementary file (TGF) in a file system of the EFT file, the stored information including:

a file path identifier identifying a position of the TGF in the file system of the EFT file, wherein the file path identifier is a concatenation of a parent file identifier of a parent file of the TGF in the file system of the EFT file, followed by an identifier of the TGF in the file system of the EFT file;

a first length indicator to indicate a length of a first type of data;

first data of the first type having a length corresponding to the length indicated by the first length indicator;

a second length indicator to indicate a length of a second type of data; and second data of the second type having a length corresponding to the length indicated by the second length indicator; and processing circuitry coupled to the memory, wherein processing circuitry, in operation, executes the application to update the TGF based on the stored information, the updating the TGF including:

identifying the TGF based on the file path identifier; and updating content of the TGF to include:

the first data; and one or more instances of the second data, wherein a number of the one or more instances of the second data is based on a size of the TGF.

16. The integrated circuit of 15, wherein the integrated circuit stores a generic test profile (GTP) including the EFT file and the application.

17. The integrated circuit of claim 15, wherein the processing circuitry, in operation:

determines whether the updating of the TGF was successful; and in response to a determination that the updating was not successful, modifies the EFT file to include an indication of an error.

18. The integrated circuit of claim 15, wherein the processing circuitry, in operation:

determines, under control of the application, a record number associated with a command to update the EFT file; and selecting performs, under control of the application, the update of the EFT file based on the determined record number associated with the command to update the EFT file.

19. The integrated circuit of claim 15, wherein the processing circuitry, in operation:

receives an update command associated with a plurality of TGFs of the EFT file;

responds, under control of the application, to the received update command by:

reading content of a first record of the EFT file byte-by-byte; and in response to a read value of a byte of the first record of the EFT file being greater than 1, performing an update operation on a TGF of the plurality of TGFs based on information stored in another record of the EFT file corresponding to the read value of the byte.

20. The integrated circuit of claim 15, wherein the GTP, the EFT file, and the application correspond to a GTP, an EFT file and a Test Applet (TA) file as defined in the GSMA TS-48 specification.

21. The integrated circuit of claim 15, wherein the integrated circuit is an embedded Universal Integrated Circuit Cards (UICC) or an integrated UICC.

22. A system, comprising:

a mobile communication interface; and an integrated circuit coupled to mobile communication interface, the integrated circuit including:

a memory, which, in operation, stores an Elementary File Test (EFT) file and an application, the EFT file including a record storing information to update a target elementary file (TGF) in a file system of the EFT file, the stored information including:

a file path identifier identifying a position of the TGF in the file system of the EFT file, wherein the file path identifier is a concatenation of a parent file identifier of a parent file of the TGF in the file system of the EFT file, followed by an identifier of the TGF in the file system of the EFT file;

a first length indicator to indicate a length of a first type of data;

first data of the first type having a length corresponding to the length indicated by the first length indicator;

a second length indicator to indicate a length of a second type of data; and second data of the second type having a length corresponding to the length indicated by the second length indicator; and processing circuitry coupled to the memory, wherein processing circuitry, in operation, executes the application to update the TGF based on the stored information, the updating the TGF including:

identifying the TGF based on the file path identifier; and updating content of the TGF to include:

the first data; and one or more instances of the second data, wherein a number of the one or more instances of the second data is based on a size of the TGF.

23. The system of claim 22, wherein the processing circuitry, in operation:

receives an update command associated with a plurality of TGFs of the EFT file;

responds, under control of the application, to the received update command by:

reading content of a first record of the EFT file byte-by-byte; and in response to a read value of a byte of the first record of the EFT file being greater than 1, performing an update operation on a TGF of the plurality of TGFs based on information stored in another record of the EFT file corresponding to the read value of the byte.

24. The system of claim 22, comprising a first device including the mobile communication interface and the integrated circuit, wherein the integrated circuit is an embedded Universal Integrated Circuit Cards (eUICC) or an integrated UICC (i-UICC).

25. The system of claim 24, comprising a second device coupled to the first device, wherein the second device, in operation, initiates execution of a test of the first device, the test using the updated TGF.

26. A non-transitory computer-readable medium having contents which configure processing circuitry to perform a method, the method comprising:

storing, in a record of an Elementary File Test (EFT) file of an integrated circuit, information to update a target elementary file (TGF) in a file system of the EFT file, the stored information including:

a file path identifier identifying a position of the TGF in the file system of the EFT file, wherein the file path identifier is a concatenation of a parent file identifier of a parent file of the TGF in the file system of the EFT file, followed by an identifier of the TGF in the file system of the EFT file;

a first length indicator to indicate a length of a first type of data;

first data of the first type having a length corresponding to the length indicated by the first length indicator;

a second length indicator to indicate a length of a second type of data; and second data of the second type having a length corresponding to the length indicated by the second length indicator; and updating the TGF based on the stored information, the updating the TGF including:

identifying the TGF based on the file path identifier; and updating content of the TGF to include:

the first data; and one or more instances of the second data, wherein a number of the one or more instances of the second data is based on a size of the TGF.

27. The non-transitory computer-readable medium of claim 26, wherein the contents comprise instructions executed by the processing circuitry.

28. The non-transitory computer-readable medium of claim 26, wherein the method comprises:

receiving an update command associated with a plurality of TGFs of the EFT file;

responding to the received update command by:

reading content of a first record of the EFT file byte-by-byte; and in response to a read value of a byte of the first record of the EFT file being greater than 1, performing an update operation on a TGF of the plurality of TGFs based on information stored in another record of the EFT file corresponding to the read value of the byte.

* * * * *